US008818606B2

(12) United States Patent
Lee et al.

(10) Patent No.: US 8,818,606 B2
(45) Date of Patent: Aug. 26, 2014

(54) SYSTEM AND METHOD FOR VEHICLE LATERAL CONTROL (75) Inventors: Jin-Woo Lee, Rochester Hills, MI (US); Bakhtiar Brian Litkouhi, Washington, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/447,800

(22) Filed: Apr. 16, 2012

(65) Prior Publication Data
US 2013/0274985 A1  Oct. 17, 2013

(51) Int. Cl.
G05D 1/02 (2006.01)
G01S 19/50 (2010.01)
B60W 10/20 (2006.01)

(52) U.S. Cl.
CPC ............... *G01S 19/50* (2013.01); *B60W 10/20* (2013.01); *G05D 1/02* (2013.01)
USPC ........................................................ 701/23

(58) Field of Classification Search
USPC ........................................................ 701/23
See application file for complete search history.

(56) References Cited

U.S. PATENT DOCUMENTS

| | | | | |
|---|---|---|---|---|
| 6,212,453 | B1* | 4/2001 | Kawagoe et al. | 701/41 |
| 6,473,678 | B1* | 10/2002 | Satoh et al. | 701/41 |
| 6,580,986 | B1* | 6/2003 | Uenuma et al. | 701/41 |
| 7,274,981 | B2* | 9/2007 | Eriksson | 701/37 |
| 7,418,372 | B2* | 8/2008 | Nishira et al. | 703/2 |
| 7,706,945 | B2* | 4/2010 | Deng et al. | 701/41 |
| 7,711,464 | B2* | 5/2010 | Kaufmann | 701/41 |
| 7,885,730 | B2* | 2/2011 | Kaufmann et al. | 701/1 |
| 7,890,231 | B2* | 2/2011 | Saito et al. | 701/41 |
| 8,170,725 | B2* | 5/2012 | Chin et al. | 701/1 |
| 8,406,957 | B2* | 3/2013 | Kim | 701/41 |
| 2007/0067085 | A1* | 3/2007 | Lu et al. | 701/70 |

* cited by examiner

*Primary Examiner* — Thomas Tarcza
*Assistant Examiner* — Alex C Dunn
(74) *Attorney, Agent, or Firm* — Mark S. Cohen; Pearl Cohen Zedek Latzer Baratz LLP (57) ABSTRACT A method, system and computer readable medium to autonomously keep a vehicle in a lane. The method including, engaging a lane centering system configured to maintain the vehicle within the lane, at a specified lane position. Further engaging a lane keeping system when the lane centering system fails to keep the vehicle within the lane, the lane keeping system configured to return the vehicle to the lane, when the vehicle leaves or is leaving the lane. And, applying a cost function to determine the nature of engagement of the lane keeping system to return the vehicle to the lane.

3 Claims, 6 Drawing Sheets

SYSTEM AND METHOD FOR VEHICLE LATERAL CONTROL

FIELD OF THE PRESENT INVENTION

The present invention is related to the lateral control of a vehicle via a lane keeping system and a lane centering system.

BACKGROUND

Limited Ability Autonomous Driving Systems typically allow some driving functions to be taken over by the vehicle and its onboard computers. The systems can interface with human drivers in a number of different ways including: elbow switches haptic driver seats, audio, visual and touch sensors, foot switches, exogenous displays, lights and/or sounds.

Examples of some components of Limited Ability Autonomous Driving Systems may include a lateral vehicle control system, which itself may include, a lane centering system and lane keeping systems that aim to provide a wide range of assistance in keeping the vehicle within the driving lane under a number of possible and varied circumstances.

During autonomous driving, a driver should be able to override the steering control anytime that he/she wants. When a driver steering override is detected, then the lane centering/keeping system should yield the steering control to the driver.

In some instances, lane centering algorithms may falsely detect steering overrides to the system, may translate unintentional steering overrides as intentional steering overrides, may provide too much lateral motion when steering, may determine an inaccurate path for the vehicle, and/or may otherwise lead to the vehicle unintentionally drifting out of the correct lane.

SUMMARY

An implementation algorithm for vehicle lateral control may be susceptible to false interpretations of a driver's intentions. In some examples, a lateral vehicle control system may include combining lane keeping and lane centering systems and algorithms to enhance lane centering fault tolerances.

In some examples, a system may autonomously keep a vehicle in a lane by engaging a lane centering system, as described below, configured to maintain the vehicle within the lane, and engaging a lane keeping system, as described below, the lane keeping system configured to return the vehicle to the lane.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of the invention. It will however be understood by those skilled in the art that the present invention may be practiced without these specific details. In other instances, well-known methods, procedures, and components have not been described in detail so as not to obscure the present invention.

Unless specifically stated otherwise, as apparent from the following discussions, it is appreciated that throughout the specification discussions utilizing terms such as "processing," "computing," "storing," "determining," "evaluating," "calculating," "measuring," "providing," "transferring," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

Autonomous, semi-autonomous, automated, or automatic steering control features (e.g., automated lane centering, adaptive lane centering, etc.) may maintain or control the position of a vehicle with respect to the road, or with respect to a lane on the road, the lane typically demarcated by lane markings, with reduced driver input (e.g., movement of a steering wheel).

In some examples, autonomous, semi-autonomous, automated, or automatic steering control features may include a lateral vehicle control system. Typically, the lateral vehicle control system may include a lane centering system configured to maintain a vehicle within a center or near the center of a lane, and a lane keeping system, the lane keeping system configured to keep the vehicle within the lane. Typically, lane keeping system may be configured to keep the vehicle within the lane independent of the lane centering system, e.g., the lane keeping system runs in parallel with the lane centering system, and may be activated if the lane centering fails to maintain the vehicle in the lane. In some examples, lane keeping system may be configured to keep the vehicle within the lane when the lane centering system fails to keep the vehicle within the lane.

In some examples, the driver may need to regain full control of the vehicle steering controls and deactivate or disengage a steering control system. The driver may regain control of the vehicle, for example, when another vehicle swerves into the driver's lane, an obstacle lies in front of the vehicle, the vehicle comes into close proximity with a guardrail, the driver switches lanes, or in other circumstances, in which the driver may need to regain full control.

When the driver encounters a circumstance requiring the driver to regain control of the steering, and even, in some examples, to regain control quickly, a system override may have to be performed quickly and easily, typically, by an onboard system.

In some examples, the lateral vehicle control system may misjudge the driver's intentions and allow for a system override, typically by disengaging the lane centering system. The lateral vehicle control system may detect that the driver is not otherwise overriding the system and may engage the lane keeping system to re-center the vehicle and reengage the lane keeping system.

The lateral vehicle control system may, in some examples, function with high precision at low speeds, high speeds, on curved roads, on banked roads, and/or in other driving scenarios.

Typically, at lower speeds more torque may be required to steer the vehicle than at high speeds; therefore, the minimum torque required to override the system may be higher at low speeds than high speeds. At higher speeds, less torque may be required to steer the vehicle than at low speeds; therefore, in some examples, the minimum torque required to override a steering system may be lower at high speeds to ensure the driver may easily regain control of the vehicle if needed.

Typically, when a vehicle turns while driving on a curved or banked road, greater or less steering torque may be required to steer the vehicle depending on the direction of the turn. According to some examples, an automated vehicle steering control override system, or other systems on board the vehicle may adapt to different driving scenarios or conditions. The lateral vehicle control system may adapt to driving scenarios by calculating expected steering torque and steering angle values based on measured, calculated and/or pre-determined vehicle steering measurements and/or outside conditions.

In some examples, a vehicle may be equipped with an adaptive or automatic lane centering feature or application, e.g., a lane centering system. Typically, a lane centering feature may maintain a constant lane offset or vehicle position relative to a lane on the road the vehicle is driving upon.

In some examples, a computer vision sensor, in some examples, a camera, a Light Detection And Ranging (LIDAR) optical remote sensing technology sensor, or other types of sensors may measure data allowing an adaptive lane centering feature to determine the lane offset or relative location of the vehicle with respect to road features, for example, lane markers(s), road shoulder(s), median barrier(s), edge of the road and other objects or features.

The relative location of the vehicle with respect to road features may be determined based on, for example, one or a combination of global positioning system (GPS) location data, a map database of the vehicle, a forward facing camera measured relative distance to road features, and/or other information known in the art.

In some examples, a lane centering feature of a lane centering system may control vehicle steering based on the determined relative position of the vehicle in order to maintain constant or relatively constant, typically with a resolution of 5-30 cm, e.g., 10 cm vehicle lane offset or position within a lane.

A lane centering feature, in some examples, may control the direction of vehicle travel by controlling the steering angle and/or steering torque of the vehicle by outputting a steering angle control command to an electrical power steering (EPS), active front steering (AFS), or other system known in the art. The adaptive lane centering feature may, in some examples, control the steering angle directly or with or without an EPS, AFS, or other system.

In some examples, vehicle may be equipped with an automated lane keeping assist application or feature, typically a component of a lane keeping system, itself typically a component of the lateral vehicle control system. The lane keeping assist application may automatically, in some examples, when the lane centering system has been deactivated, or has failed to keep the vehicle in the lane, control the vehicle steering to ensure that the vehicle stays within a pre-determined lane or path on a road, or other driving interface.

A lane keeping system may, in some examples, have some or no control of the vehicle steering, unless the vehicle begins to move out of a lane, at which point the lane keeping system may automatically control the steering to maintain the vehicle within the lane. In some examples, the lane keeping system may not be activated when the lane centering system is activated.

A lane keeping system may function by determining the relative position of the vehicle with respect to road features (e.g., lane marker(s), road shoulder(s), median barrier(s), or other road features) and adjust the steering control to maintain the vehicle within a lane. The relative position of the vehicle with respect to road features may be determined based on a GPS location data of the vehicle, data from a forward looking camera, data from a digital MAP, data from one or a plurality of vehicle motion sensors and/or other data regarding the vehicle, including measured relative distance to road features, or other information known in the art.

The lane keeping system may control the vehicle steering based on a determined relative position of the vehicle in order to maintain the vehicle within a lane. The lane keeping system may control the direction of vehicle travel by controlling the steering angle and/or steering torque of the vehicle by outputting a steering angle and/or steering torque control command to other system. The lane keeping system may, in some examples, control the steering angle directly or with or without an EPS, AFS or other systems known in the art.

According to some examples, the lateral vehicle control system, or another onboard system in the vehicle may measure, estimate, or evaluate, using sensor(s) associated with the vehicle, vehicle steering measurements or vehicle steering conditions such as the steering angle and steering torque of a vehicle, and in some examples, other measurements as are known in the art.

Vehicle steering measurements or vehicle steering conditions may be measured, estimated, or evaluated at pre-determined intervals, in some examples, every 5-100 milliseconds, e.g., every 10 milliseconds, while the vehicle is in motion.

The lateral vehicle control system may include other systems that measure steering angle, steering torque, acceleration, lateral acceleration, longitudinal acceleration, speed, yaw-rate and/or other vehicle dynamics or steering measurements while a steering control system, e.g., the lane centering system, is activated. In some examples, these measurements may be compiled continuously while the vehicle is in motion.

According to some examples, the lateral vehicle control system, or a component thereof, may determine, based on the measured vehicle steering measurements (e.g., steering torque, steering angle), and/or other information (e.g., speed, acceleration, heading, yaw-rate, other driver input, and other information known in the art) of a vehicle, whether to override, de-activate, or disengage a steering control system, e.g., a lane centering system.

According to some examples, the lateral vehicle control system may include other systems that may be activated, and may output a steering angle command to an automated steering override detection system. An automated steering override detection system may be based on, for example, the steering angle and/or steering torque wherein automatic vehicle control system may calculate an expected steering angle and/or expected steering torque.

In some examples, the lateral vehicle control system may disengage an automated steering control system, typically, a lane centering system. Typically, if the absolute value of the difference between measured steering torque and the expected steering torque is greater than a predetermined threshold torque value, then an automated steering control system. e.g., a lane centering system, may be disengaged. In some examples, if the absolute value of the difference between a measured steering angle and the expected steering angle is greater than a predetermined threshold steering angle value, then an automated steering control system may be disengaged.

In some examples, when the override ends, lane centering system 95 may be configured to be reengaged.

The predetermined threshold steering angle and predetermined threshold torque values may depend or vary based on vehicle speed(s), road condition(s), curvature of the road, steering system dynamics, type of vehicle, and/or other factors. Other or different vehicle steering or vehicle dynamics measurements known in the art, may factor into the decision to override. The terms measurement, parameter, condition, value, and other terms may, in some examples, be used interchangeably and have equivalent or similar meaning.

Figure 1:
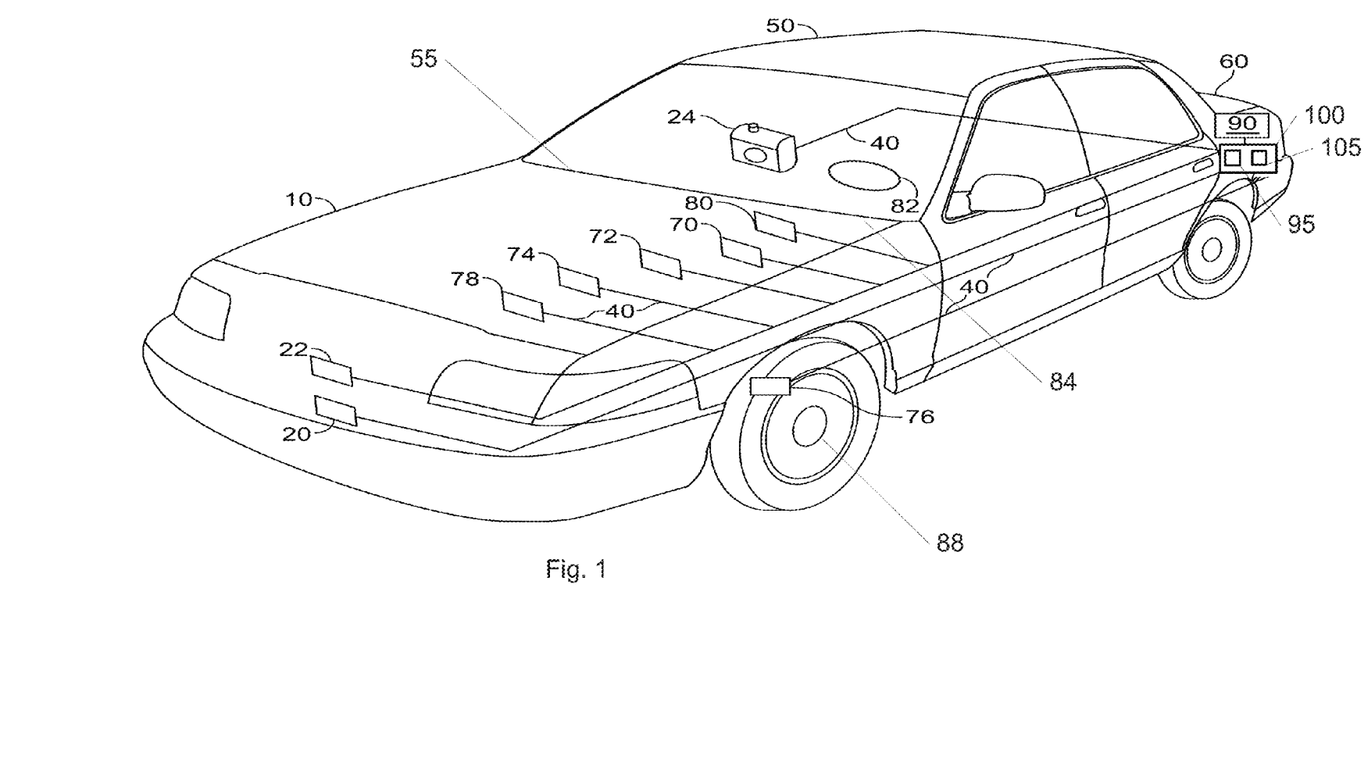
FIG. 1 is a schematic diagram of a vehicle with a lateral vehicle control system, according to an example.

FIG. 1 is a schematic illustration of a vehicle with a lateral vehicle control system, the system 100 which includes both a lane centering system 95 and a lane keeping system 105. The lane keeping system 105 configured to interact with lane centering system 95, according to an example.

The location of any particular component in the illustration is for illustrative purposes only and is not indicative of the actual location of the component.

Typically, lane centering system 95 may be configured to center the vehicle within a lane on the roadway, and in some examples, to maintain the vehicle in the lane.

The lane typically may be confined to an area of pavement between a set of lane markers, as is known in the art. Lane centering system 95 may be configured to allow minimal driver input and to center the vehicle within the lane with typically a smooth application of vehicle steering.

Typically, lane centering system 95 may be configured to be activated by the driver and deactivated and/or overridden and/or disengaged under a number of circumstances. In some examples, lane centering system 95 may be configured to be autonomous. In some examples, the lane centering system may be engaged by driver input. In some examples, the lane centering system may be engaged without driver input. In some examples, lane centering system 95 may be configured to be disengaged when a steering override is detected. In some examples, when the override ends, lane centering system 95 may be configured to be reengaged.

Vehicle 10 may also include a lane keeping system 105, the system typically part of a lateral vehicle control system 100, and in some examples, may interact with lane centering system 95. Lane keeping system 105 may be typically configured to keep the vehicle from drifting out of the lane. In some examples, lane keeping system 105 may be configured to return the vehicle to the lane, if vehicle 10 drifts, exits, or otherwise leaves the lane.

Typically, the drift may be the result of inadvertent action or inaction by the driver. Lane keeping system 105 is configured to forcefully bring the vehicle back into the lane, as it is perceived to drift out of the lane. In some examples, lane keeping system 105 may be configured to re-enter the vehicle in the lane if lane centering system 95 fails, or responds to a cue, e.g., a false positive, that makes the vehicle leave the lane.

A vehicle 10 (e.g., a car, truck, or another vehicle known in the art) may include a lateral vehicle control system 100. Typically, lateral vehicle control system 100 includes lane centering system 95 and lane keeping system 105, as described above.

Lateral vehicle control system 100 may operate in conjunction with or separate from one or more automatic vehicle control systems, autonomous driving applications or a vehicle automated steering systems 90. Vehicle automated steering system 90 may, for example, be one or a plurality of adaptive lane centering applications, low speed lane centering applications, lane keeping assist applications, or other applications. One or a plurality of vehicle automated steering system(s) 90 may be component(s) of system 100, or vehicle automated steering system(s) 90 may be separate from system 100.

Vehicle automated steering system 90 may, when engaged, fully or partially control the steering of vehicle 10 and reduce driver (e.g., operator of the vehicle) steering control input via the steering wheel 82 and/or steering system, which may include an electrical power steering (EPS) system and/or other components known in the art.

One or a plurality of sensors may be attached to or associated with the vehicle 10. Sensors may include a computer vision sensor (e.g., a camera) 24, LIDAR and/or Laser Detection and Ranging (LADAR) sensor 20, radar sensor 22, imager, or other remote sensing devices known in the art that may obtain data, the data useful in allowing system 100 to determine the relative location of the vehicle with respect to the road features, the road features including, for example, lane markers(s), road shoulder(s), median barrier(s), edge of the road, and/or other objects or features.

Camera 24 may, for example, measure lane offset, heading angle, lane curvature and/or other information (e.g., speed, acceleration, yaw-rate, other driver input known in the known in the art) and provide the information to system 90. Vehicle automated steering control system 90 or other systems may maintain or control the position of vehicle 10 with respect to the road based on the sensor measured relative location of the vehicle with respect to road features.

In some examples, vehicle 10 may include one or more devices or sensors to measure vehicle steering control, vehicle steering conditions, vehicle steering parameters, vehicle dynamics, driver input, or other vehicle related conditions or measurements. Vehicle dynamics measurement device(s) may include one or a plurality of steering angle sensor(s) 70 (e.g., connected to steering wheel 82 and/or another component of the steering system) and/or a steering torque sensor(s) 80 (e.g., a torsion bar, torsion sensor, torque meter, torque transducer, or other device known in the art). Steering torque sensor(s) 80 may be connected to or associated with steering wheel 82, a steering column 84, steering rack and pinion, a vehicle axle, and/or another component of the steering system known in the art. The vehicle dynamics measurement device(s) may also include one or a plurality of accelerometer(s) 72, speedometer(s) 74, wheel speed sensor(s) 76, inertial measurement unit(s) (IMU) 78, or other devices known in the art.

In some examples, steering column 84 may be connected to a rack and pinion system 86, which converts or transforms the rotary motion of the steering wheel 82 and steering column 84 into linear motion or displacement of the vehicle tires or wheels 88. A steering angle sensor 70 may be mounted to the steering wheel 82, steering column 84, an EPS system, an AFS system or be otherwise associated with the automated steering control system 90. A steering torque sensor 80 (e.g., steering torsion bar, torsion sensor, torque meter, torque transducer, or other device) may be mounted to the steering column 84, steering wheel 82, rack and pinion wheel axle or be otherwise associate with the automated steering control system 90. Steering torque sensor 80 and steering angle sensor 70 may, in some examples, be associated with or mounted on EPS, AFS, or other systems.

In some examples, the vehicle dynamics measurement device(s) may measure vehicle dynamics conditions or driver input including steering angle, steering torque, steering direction, lateral (i.e., angular or centripetal) acceleration, longitudinal acceleration, yaw-rate, lateral and longitudinal velocity, speed, wheel rotation, and other vehicle dynamics characteristics of vehicle 10 known in the known in the art.

The measured vehicle dynamics, vehicle conditions, steering measurements, steering conditions, or driver input information may be transferred to system 100 via, for example, a wired link (e.g., a controller area network (CAN) bus, Flexray, Ethernet or other wired link known in the art) 40 and/or a wireless link. The measured vehicle dynamics, vehicle conditions, steering measurements, steering conditions, or driver input information data may be used by system 100 or another system to calculate steering angle, steering torque, dead reckoning based vehicle position, and other calculations.

In some examples, lateral vehicle control system 100 may be, or may include, a computing device mounted on a dashboard 55 of the vehicle, in a passenger compartment 50, or in a trunk 60. In some examples, lateral vehicle control system 100 may be located in another part of the vehicle, may be located in multiple parts of the vehicle, or may have all or part of its functionality remotely located (e.g., in a remote server, in a portable computing device such as a cellular telephone or other devices known in the art).

While various sensors and inputs are presented hereinabove, in some examples, only a subset of the information form the sensors described above, or their inputs may be used.

Figure 2:
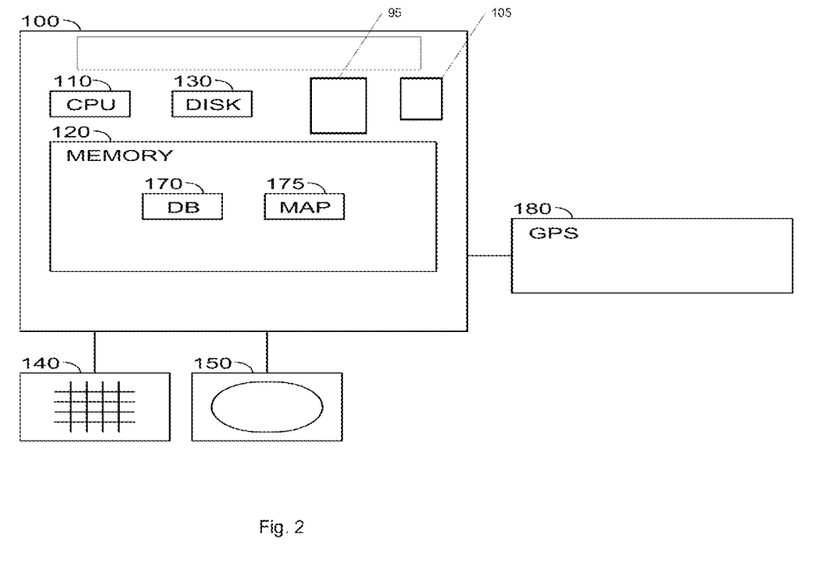
FIG. 2 is a schematic diagram of a lateral vehicle control system, including a lane centering system and a lane keeping system, according to an example.

FIG. 2 is a schematic illustration of vehicle lateral vehicle control system, in some examples, including the lane centering system 95 and lane keeping system 105, according to an example. Autonomous or automated lateral vehicle control system 100 may include one or more processor(s) or controller(s) 110, memory 120, long term storage 130, input device(s) or area(s) 140, and output device(s) or area(s) 150. Input device(s) or area(s) 140 may be, for example, a touchscreen, a keyboard, microphone, pointer device, or other device. Output device(s) or area(s) 150 may be, for example, a display, screen, audio device such as speaker or headphones, or other device. Input device(s) or area(s) 140 and output device(s) or area(s) 150 may be combined into, for example, a touch screen display and input which may be part of system 100.

System 100 may include one or more databases 170, which may include, for example, information and data regarding steering angle thresholds, steering torque thresholds, steering inertia information, steering damping information, steering stiffness information, and other information or data. Databases 170 may be stored all or partly in one or both of memory 120, long term storage 130, or another device. System 100 may also include a global positioning system (GPS) 180.

Processor or controller 110 may be, for example, a central processing unit (CPU), a chip or any suitable computing or computational device. Processor or controller 110 may include multiple processors, and may include general-purpose processors and/or dedicated processors such as graphics processing chips. Processor 110 may execute code or instructions, for example, stored in memory 120 or long-term non-transitory storage 130, to carry out examples of the present embodiments.

Memory 120 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 120 may be or may include multiple memory units.

Long term non-transitory storage 130 may be or may include, for example, a hard disk drive, a floppy disk drive, a Compact Disk (CD) drive, a CD-Recordable (CD-R) drive, a universal serial bus (USB) device or other suitable removable and/or fixed storage unit, and may include multiple or a combination of such units.

Figure 3A:
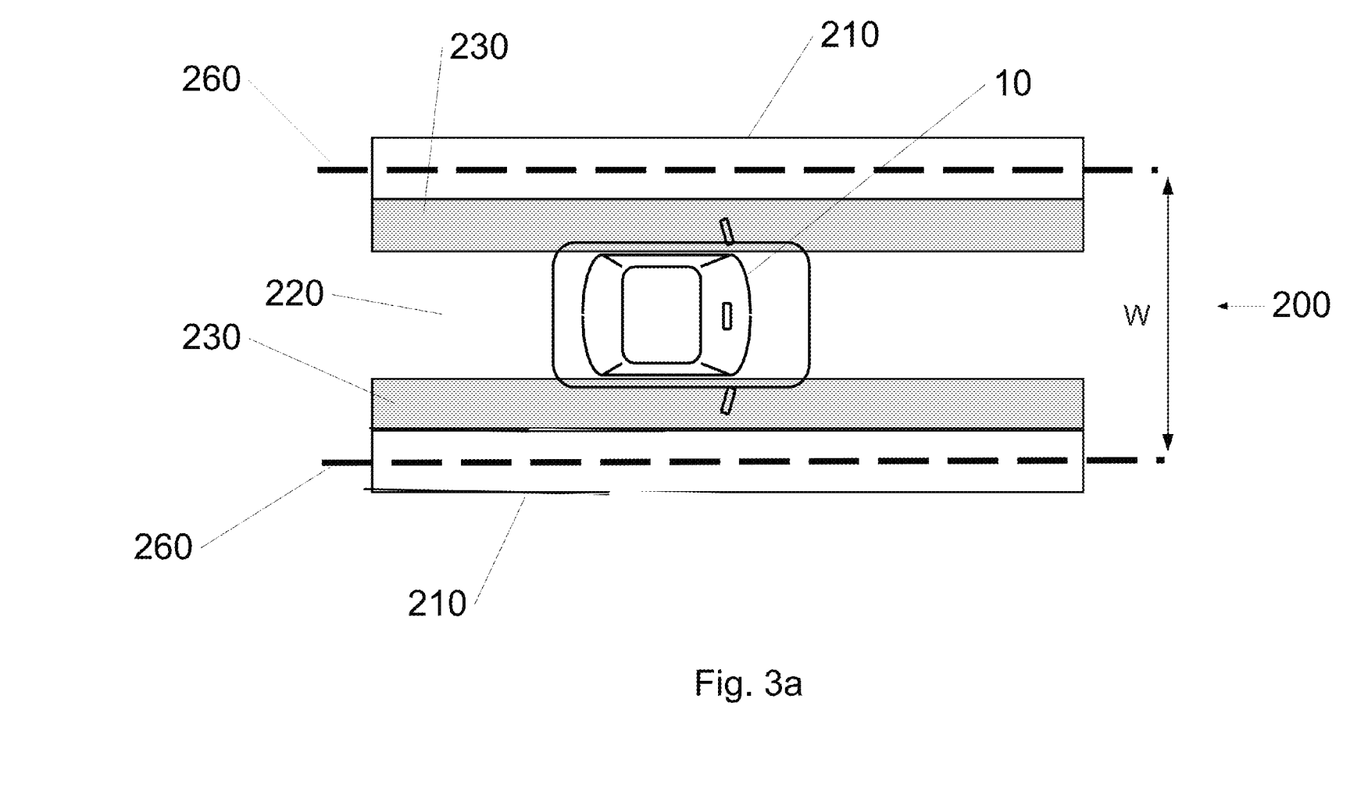
FIG. 3a is a schematic illustration of an example of a marked up lane environment, as seen by a lateral vehicle control system, according to an example.

FIG. 3a is a schematic illustration of an example of a demarcated lane environment, as viewed by lateral vehicle control system 100 and in some examples, included systems: lane centering system 95 and lane keeping system 105. A lane violation zone, e.g., Lane Keeping Control Zone (LKCZ) 210 may be defined as an area near a set of lane markings 260 on lane 200 with width W. Typically, the size and width of LKCZ 210 may vary depending on the desired lateral offset. Typically, the desired offset is not zero. Typically, LKCZ 210 is outside a lane 200, but may be within a second lane, a curb, a shoulder or other component of a driving surface.

In some examples, when vehicle 10 is traveling in a lane centering zone (LCZ) 220, i.e., an area of lane 200 wherein lane centering system intends to keep vehicle 10, a lane centering system 95 may monitor, control and or maintain the lateral movement of vehicle 10. Typically, this zone is defined as the inner 65-95% of the lane, e.g., 72% of the lane typically defined as the area of a roadway between a set of lane markers. In some examples, when the lane is 3.5 meters or 12 feet wide, lane centering zone may be 2.5 meters wide.

Typically, while the lane centering system 95 is employed by vehicle 10, lane keeping system 105 is maintained in a standby mode. In some examples, lane keeping system 105 may remain in standby mode until a sensor in the steering wheel and/or steering column, or other vehicle sensors, as described above, determine that the driver may want to regain active control of the vehicle.

In some examples, when vehicle 10 drifts, veers or otherwise moves out or leaves LCZ 220 into lane keeping transient control zone (LKTZ) 230, lane keeping system 105 may be activated. In some examples, lane centering system may be deactivated in instances where lane keepings system 105 is activated. In some examples, lane keeping system may not yet be activated in LKTZ 230 and lane centering system 95 or any other system known in the art may be activated.

In some examples, lane keeping system 105 may be partially activated in LKTZ 230, e.g., lane keeping system 105 may add an additional steering torque command on top of a lane centering system 95 steering torque commands. This additional steering torque may be relatively small, e.g., not as big as when the lane keeping is fully engaged as the vehicle enters into the LKCZ 210.

In some examples, LKTZ 230 may be defined empirically and/or in real time, depending on characteristics of the vehicle, the environment and the speed of the vehicle. In some examples. LKTZ 230 may be defined as the area of roadway that the car will traverse in a given amount of time before exiting the lane, given particular characteristics of the vehicle, including vehicle size, weight and speed, environmental factors such as the nature of the roadway and weather conditions, and other conditions such as width of the lane and width of the lane markers, and other factors known in the art.

In some examples, lane keeping system 105 may be activated when steering controls may have been overridden by the driver, but wherein other indications of intentions to move out of the lane, e.g., signaling or other indications known in the art are not evident.

In some examples, LKCZ 210 may be located at or near the lane markings 260. In some examples, LKCZ 210 may be the area that is defined as 10 cm to the left and 10 cm to the right of the lane markings 260.

The Lane Violation Zone, (LVZ) 250 may be defined as an area outside of the lane markings 260, and excluding the area defined by LKCZ 210.

When vehicle 10 is in LKTZ 230 lane keeping system 105 may be configured to predict vehicle 10's trajectory to determine if vehicle 10 will enter a LKCZ 210 within a pre-specified amount of time, the pre-specified amount of time ranging from 0.1-1 seconds, e.g., 0.5 seconds.

Figure 3B:
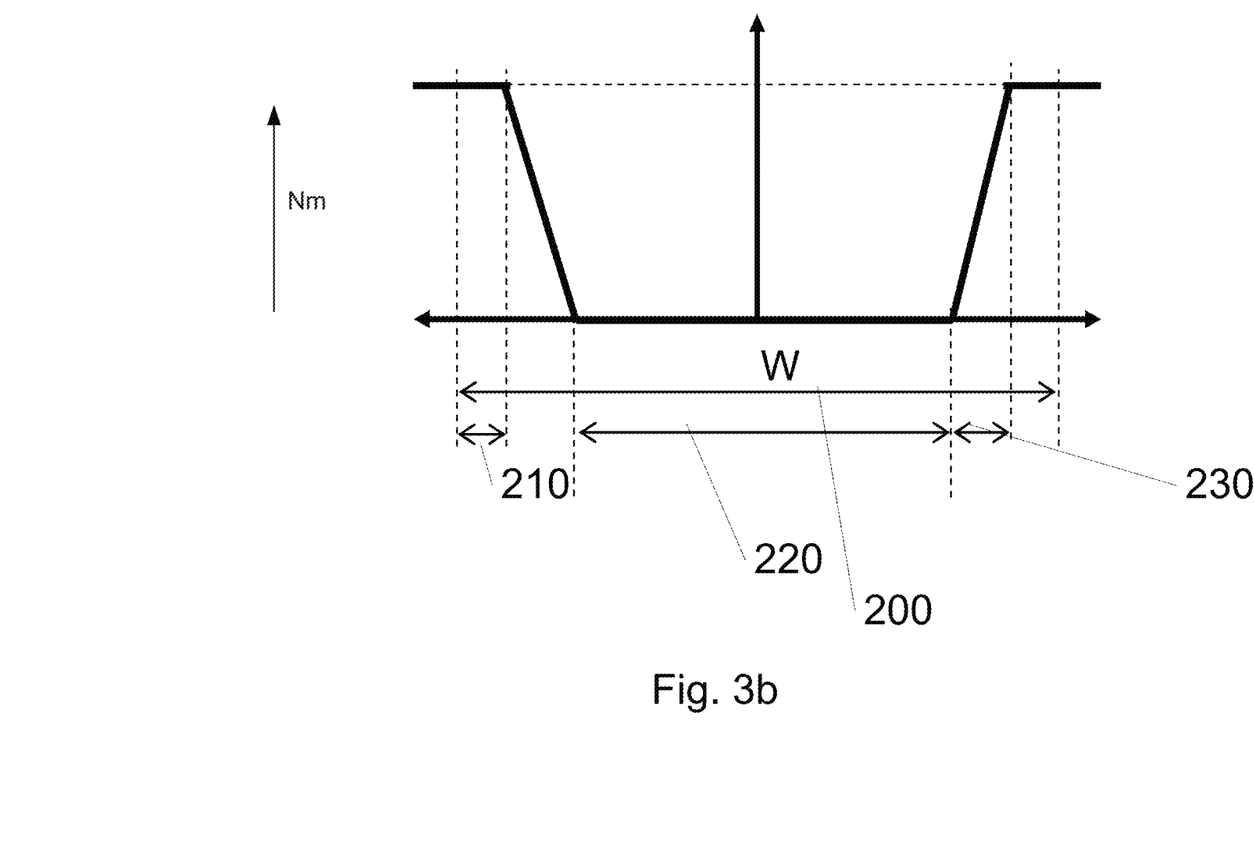
FIG. 3b is a schematic illustration of the relationship between the level of torque for steering control applied by a lateral vehicle control system and the location of vehicle with regard to the lane, according to an example.

FIG. 3b is a schematic illustration of the relationship between the level of torque for steering control applied by lateral vehicle control system 100 and the location of vehicle 10 with regard to a lane and/or lane markers on a roadway, the particular locations described above with reference to FIG. 3a Vehicle position is measured on the X axis of the illustration, and torque command representing the level of control that the vehicle automated steering control system 90 expresses is in units of Newton meters (Nm) and is measured on the Y axis.

Typically, the intersection of the X and Y axis represents a maximum allowable steering torque for lane centering system 95, e.g., a possible maximum steering torque allowed for lane centering, typically between 1.0 Nm and 2.5 Nm, e.g., 1.5 Nm, Typically, it may be pre-determined by the lane centering performance specifications, and/or vehicle specifications.

Typically, the maximum allowable steering torque for use in lane keeping system 105, e.g., the maximum level of torque of lateral vehicle control system 100, which may include both a lane keeping and a lane centering system 95, may typically be, for example, 3 Nm In some examples, lane keeping system 105 may apply other maximum allowable steering torque levels.

Typically, the applied level of torque by lateral vehicle control system 100 may be between 0 Nm to 1.5 Nm when vehicle 10 is situated within LCZ 220.

As the position of vehicle 10 drifts along width W of the X axis, out of the LCZ 220 and into LKTZ 230, torque may be applied to the steering column of vehicle 10, the applied torque, typically will be felt by the driver as a gradual motion rather than a jerky or jerking motion through the application of torque.

If vehicle 10 enters LKCZ 210, a maximum amount of a predetermined allowable amount of torque will be provided to the steering column to turn the vehicle. Typically, this amount of torque will be between 2 Nm to 5 Nm, e.g., 3 Nm.

In some examples, the 3 Nm amount of applied torque is a relative value relating to the amount of torque felt by the driver, and may represent the amount of torque over and above a baseline amount of torque provided by the lane centering system 95 component of lateral vehicle control system 100.

While vehicle 10 is in LKTZ 230, lateral vehicle control system 100 may determine what level of torque to provide to the steering of vehicle 10, the level of torque represented by the curve on the figure, and typically between 1.5 Nm and 3.0 Nm.

Typically, when vehicle enters LKTZ 230, a cost function, an example thereof described below, is applied to determine the steering angle, and in some examples, the torque that may be applied to the steering column or another component of vehicle 10.

Typically, the cost function may be applied to determine the nature of the return of the vehicle to the lane, by lane keeping system 105. Typically, the nature of the return of the vehicle to lane 200 may be characterized by angle of re-entry of the vehicle to lane 200, the angle may be controlled via steering the vehicle. In some examples, the nature of the return of the vehicle to lane 200 may be characterized by the amount of torque applied to the steering of the vehicle back into lane 200. In some examples, the nature of the return of the vehicle to lane 200 may be characterized by the speed at which the vehicle returns to lane 200. In some examples, the nature of the return of vehicle 10 to lane 200 may be characterized by the number of step-wise functions that vehicle 10 does as it returns to lane 200. In some examples, the nature of the return of vehicle 10 to lane 200 may be characterized by one or a plurality of the above mentioned examples.

In some examples, solving the cost function may results in a steep angle of return to the lane. In some examples, solving the cost function may result in the determination that a gradual angle may be used to return the vehicle to the lane. In some examples, solving the cost function may result in applying a larger amount of torque to steer the vehicle back into the lane. In some examples, solving the cost function may result in the system determining that a lesser amount of torque is needed to return the vehicle to the lane.

In some examples, solving the cost function, may result in the system determining that more than one step may be required to return the vehicle to the lane. In some examples, the more than one step may include the vehicle first turning at a particular angle, and a second step where the vehicle turns at another angle, the combination of the steps may return the vehicle to the lane.

The cost function may take into account the yaw rate, lateral speed of the vehicle, distance to lane markings 260, steering angle, and time. Typically, a cost function as is known in the art may be applied wherein:

$$J = \int_0^{t_{lk}} \left\{ [y \quad \phi]_{err} \cdot Q(x) \cdot \begin{bmatrix} y \\ \phi \end{bmatrix} + \delta \cdot R(t) \cdot \delta \right\} dt$$

Where:

$y_{err}$ is the lateral offset error, e.g., $(y_{desired} - y_{predicted})$;

$\phi_{err}$ is the heading angle error, e.g., $(\phi_{desired} - \phi_{predicted})$; and, Q (t) and R (t) are weighting factors derived empirically.

In some examples, a cost function may be applied wherein:

$$\begin{bmatrix} \dot{y} \\ \dot{\phi} \\ \dot{v}_y \\ \dot{r} \end{bmatrix} = \begin{bmatrix} 0 & v_x & 1 & 0 \\ 0 & 0 & 0 & 1 \\ 0 & 0 & -\dfrac{C_f + C_r}{mv_x} & \dfrac{bC_f + aC_f}{mv_x} - v_x \\ 0 & 0 & \dfrac{bC_f + aC_r}{Iv_x} & \dfrac{a^2 C_f + b^2 C_f}{Iv_x} \end{bmatrix} \cdot$$

$$\begin{bmatrix} y \\ \phi \\ v_y \\ r \end{bmatrix} + \begin{bmatrix} 0 \\ 0 \\ \frac{C_f}{m} \\ \frac{aC_f}{I} \end{bmatrix} \cdot \delta + \begin{bmatrix} 0 \\ v_x \\ 0 \\ 0 \end{bmatrix} \cdot \rho$$

Where:
y is the predicted lateral vehicle offset to the lane center;
φ is the orientation angle of the lane;
$v_x$ is the vehicle longitudinal speed;
$v_y$ is the vehicle lateral speed;
r is the vehicle yaw rate;
δ is the steering angle;
ρ is the road curvature;
$C_f$ and $C_r$ represent corner stiffness;
m is the vehicle's mass; and,
I is the vehicle's inertia; as is known in the art.

Solving for and/or applying the cost function typically will provide the steering angle necessary to re-center vehicle 10. The steering angle can be converted into the necessary torque via equations known in the art.

In some examples, the steering angle may be too high to be executed by lane keeping system 105 within prescribed parameters of lateral vehicle control system 100. Typically, when the steering angle is too high, the steering rate may be changed more slowly by an empirically derived change rate.

In some examples, when vehicle 10 reaches LKCZ 210, a maximum amount of torque may be provided to the steering column to re-center vehicle 10. In some examples, the maximal amount of torque may not be provided until vehicle 10 begins to cross, or in some examples, crosses the lane markings 260. In some examples, when vehicle 10 reaches LKCZ 210, a maximal of torque may be provided to the steering column to re-center vehicle 10.

Figure 4:
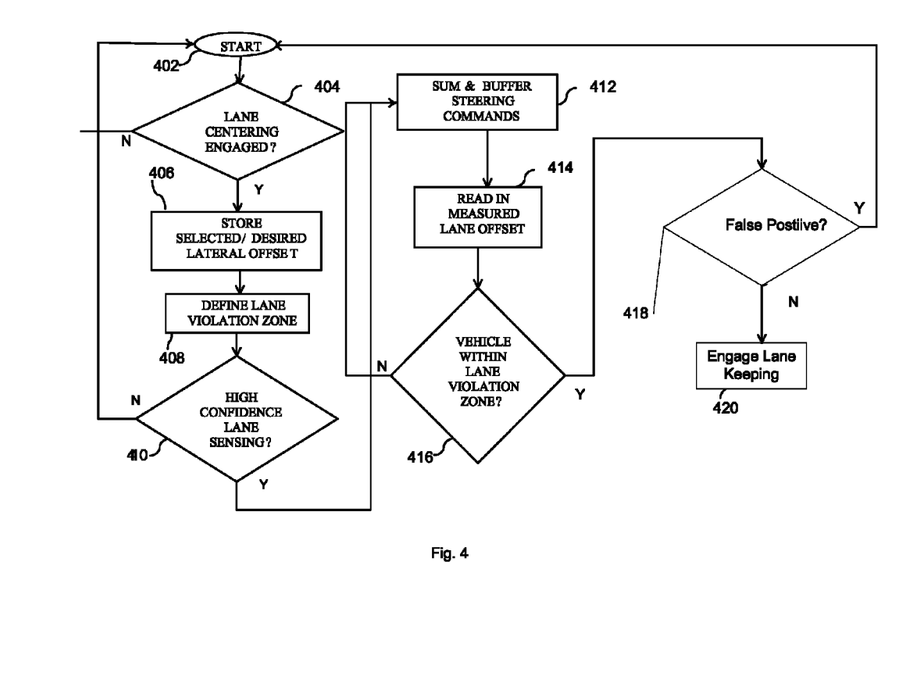
FIG. 4 is a flowchart of a method for lane centering and lane keeping, according to an example; and, FIG. 5 is a flowchart of a method of applying lane centering and lane keeping, according to an example.

FIG. 4 is a flowchart of a method for automated lateral control, according to an example.

The operations of the flowchart may be carried out by vehicle automated steering control system and/or lateral vehicle control system 100 or by other systems associated with or separate from vehicle 10.

As depicted in block 402, a system may be configured to be started. In some examples, the system may be started by a second system, as is known in the art. In some examples, the system may be started by the driver of vehicle 10. In some examples, the system may be turned on by default when vehicle 10 is started. In some examples, the system may be turned on by default given road conditions, the speed of vehicle 10 or other conditions that are known in the art.

In some examples, the system may be initiated when an action (e.g., a push of a button, activation of a switch, or other activations known in the art) is performed by a driver to engage the system.

As depicted in block 404, the system or process may be activated when a lane centering system 95 is also engaged. Typically, system will not activate unless the lane centering system 95 is also engaged. In some examples, the lane centering system 95 may include within the lateral vehicle control system 100.

When the lane centering system 95 is engaged, the system may then automatically control the direction and/or heading of vehicle travel as is known in the art.

If the lane centering system 95 is activated, the system may then select and store desired variables, included the desired lateral offset, as described above as well and any lane violation zones as described above. The two variables depicted in blocks 406 and 408, respectably. In some applications, other variables as known in the art may also be selected and stored by the system.

The system may then determine the degree of confidence the system has with the any lane sensing capabilities, the lane sensing capabilities either a component of the system or a component of another system in vehicle 10 as is known art, as depicted by diamond 410. In instances wherein the system lacks the requisite confidence, the system may revert back to a standby stage or back to block 402.

In some examples, wherein the system determines that it has the requisite confidence in lane sensing, then the system will continue to the next step.

As depicted in block 412, the system may upload past steering commands recorded over a past time period, e.g., over the past number of seconds, e.g., 0-60 seconds, for example, 30 seconds.

Typically, this data is used to calculate cost functions as described above.

In some examples, steering torque expected, $\tau_{expected}$ and steering angle expected, $\delta_{expected}$ may be calculated, determined, or formulated by system 100. In some examples, steering torque expected, $\tau_{expected}$ and steering angle expected, $\delta_{expected}$, may be calculated using a simple second order model, the solution to a differential equation, a look-up table, a linear transformation or other mathematical model or approach. Steering torque expected, $\tau_{expected}$ and steering angle expected, $\delta_{expected}$ may be calculated at regular intervals, in some examples, every 5-30 milliseconds, e.g., or may be calculated continuously by system 100 while automated steering control system 90 is engaged.

Typically, system 100 or other systems in vehicle 10 maintain the vehicle within a lane with little to no driver involvement. Instances wherein a system does not maintain vehicle 10 within lane 200 may be the result of a failure of a tire or an onboard system. Typically, when a system or tire fails vehicle 10 may begin to drift within lane 200. In instances where vehicle 10 begins to drift, system 100 may determine an asymmetrical application of steering torque, either by the driver, or by an onboard system in vehicle 10. In some examples, a steering actuator may be falsely exercising too much lateral motion, pushing the vehicle towards a lane outside of lane 200. In some examples, an onboard system may falsely detect a steering override and allow vehicle 10 to move out of lane 200 without the driver's intent. In some applications an onboard system may incorrectly determine a path for vehicle 10, leading vehicle 10 out of lane 200.

In some examples, asymmetrical torque may be determined by evaluating the difference between steering torque expected, $\tau_{expected}$, and the empirical values determined by onboard sensors described above and the difference between steering angle expected, $\delta_{expected}$ and empirical values determined by onboard sensors, the sensors described above.

As illustrated in block 414, vehicle 10 may evaluate the lane offset as determined by sensors, as described above. In some examples, vehicle 10 may evaluate a plurality of vehicle steering conditions using a plurality of sensors associated with vehicle 10. In some examples, system 100 may read in measured lateral offset data from lane markings 260.

As illustrated in block 416, vehicle 10 may evaluate, based on lane sensing and other criteria, described hereinabove, whether vehicle 10 is within a lane violation zone, including LKTZ 23 and LKZ 240.

If vehicle 10 is determined to be within a lane violation zone, including LKTZ 230 and/or LKZ 240, vehicle 10 may determine whether the driver intends to move out of the current lane 200. In some examples, the determination may be made by an onboard system examining whether a turn signal has been activated. In some examples, vehicle 10 may determine if an auto lane change request system is activated. Other indications that the driver intends to leave the current lane, as known in the known in the art, may also be employed by vehicle 10, as illustrated in block 418.

Typically, if vehicle 10 determines that the driver intends to move out of lane 200, then vehicle lane centering system 95 may be disengaged (e.g., by system 100) and steering control may be fully or partially relinquished to lane keeping system 105, as depicted by block 420.

An alert, indication, alarm or signal may be provided to the driver by system 100 prior to or after disengaging and/or de-activating the lane centering system 95, an alert may be, for example, an audible alert, light, signal, notification or other form of alert.

Figure 5:
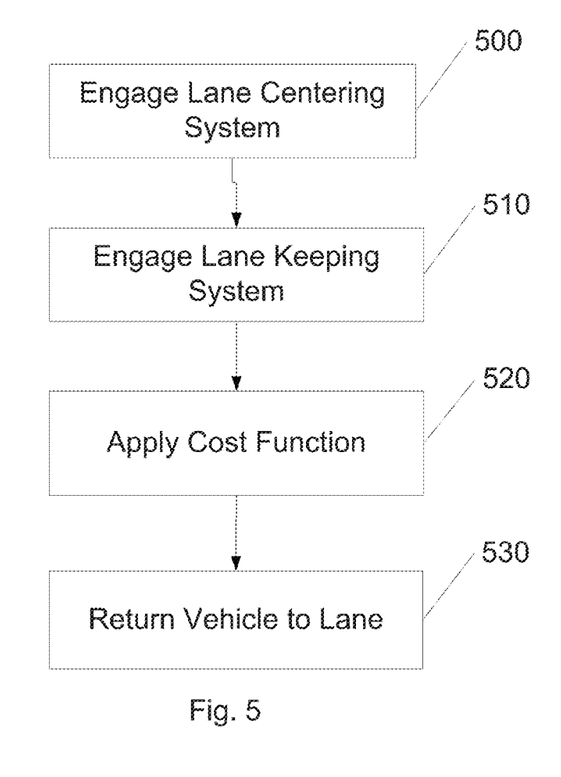

FIG. 5 is a flowchart of a method of a lateral vehicle control system according to an example.

In some examples, systems 95 and 105 provide a method to autonomously keep a vehicle in a lane. Typically, the method includes engaging a lane centering system 95. Lane centering system 95 may be configured to maintain the vehicle within the lane, as depicted in box 500. In some examples, the vehicle may engage a lane keeping system 105 when the lane centering system 95 fails to keep the vehicle within the lane, as depicted in box 510. In some examples, lane keeping system 105 may typically be configured to return the vehicle to the lane.

Typically, when lane keeping system 105 is engaged, lane centering system 95 is disengaged or enters a standby mode. In some examples, lane keeping system 105 may be engaged when lane centering system 95 mistakenly determines that the driver of vehicle 10 intends to regain control of the steering of vehicle 10. In some examples, lane centering system 95 may mistakenly determine that the driver of vehicle 10 intends to regain control of the vehicle when the driver turns the steering wheel with ample or sufficient force to suggest that the driver wants to change the direction of the vehicle. In some examples, other cues, as are known in the art may indicate that the driver of vehicle 10 intends to disengage lane centering system 95 and/or regain control of vehicle 10.

In some examples, lane keeping system 105 may determine that the cues used by lane centering system 95 were false positives. In some examples, lane keeping system 105 may determine that cues relied on by lane centering system 95 were false positives when the driver does not signal with the vehicle's signaling system their intent to move out of the current lane. In some examples, other indications, as known in the art, may be employed to determine that the cues were false positives.

Typically, when lane keeping system 105 detects that a false positive cue relied upon by lane centering system 95 it may apply a cost function to determine how to return vehicle 10 to lane 200, i.e., the nature of engagement of lane keeping system 105. In some examples, applying the cost function, lane keeping system 105 may gradually, with a lesser amount of torque applied to the steering column, return vehicle 10 to lane 200.

In some examples, lane keeping system 105 may apply a greater or lesser amount of torque depending on the location of vehicle 10 in lane 200. In some examples, when vehicle 10 has not yet crossed lane markings 260, a lesser amount of torque may be provided and the nature of the provided torque may be more gradual and less jerky motion. In some examples, if vehicle 10 has crossed lane markings 260 or in some examples, has partially crossed, or is about to cross lane markings 260 of lane 200, lane keeping system 105 may apply a greater amount of torque, in some examples, up to 3 Nm of torque to the steering column to return vehicle 10 to lane 200. In some examples, the application of torque by lane keeping system 105 when vehicle 10 is leaving lane 200, may be a jerky motion, the motion typically noticeable but controlled.

In some examples, a cost function may determine the amount of torque to be provided by lane keeping system 105 to return vehicle 10 to the lane. In some examples, a cost function may be applied to determine at what angle vehicle 10 may be returned to lane 200. In some examples, lane keeping system 105 may determine that instead of applying a large angle of steering to return vehicle 10, lane keeping system 105 may apply two or more smaller steering angles in two or more steps to return vehicle 10 to lane 200, as depicted in box 520. Typically, vehicle 10 may be returned to lane 200 after lane keeping system 105 applies the steering angle and/or torque as determined by applying the cost function, as depicted in box 530.

Examples of the present invention may include apparatuses for performing the operations described herein. Such apparatuses may be specially constructed for the desired purposes, or may comprise computers or processors selectively activated or reconfigured by a computer program stored in the computers. Such computer programs may be stored in a computer-readable or processor-readable non-transitory storage medium, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions. It will be appreciated that a variety of programming languages may be used to implement the teachings of the invention as described herein. Examples of the invention may include an article such as a non-transitory computer or processor readable non-transitory storage medium, such as for example, a memory, a disk drive, or a USB flash memory encoding, including or storing instructions, e.g., computer-executable instructions, which when executed by a processor or controller, cause the processor or controller to carry out methods disclosed herein. The instructions may cause the processor or controller to execute processes that carry out methods disclosed herein.

Different examples are disclosed herein. Features of certain examples may be combined with features of other examples; thus, certain examples may be combinations of features of multiple examples. The foregoing description of the examples of the invention has been presented for the purposes of illustration and description. It is not intended to be exhaustive or to limit the invention to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the invention.

What is claimed is:

1. A vehicular, autonomous steering system-comprising:
   a lane centering system configured to apply a centering torque so as to maintain travel of a vehicle centered in a lane centering zone of a lane;
   a lane keeping system operative in accordance with a cost function employing predictive lateral offset and predictive heading angle, the lane keeping system configured to apply a torque so as to restore the travel of the vehicle in the lane centering zone, the torque exceeding the centering torque; and a processor configured to transfer steering control from the lane centering system to the lane keeping system responsively to a detected failure of the lane centering system.

2. A method to autonomously steer a vehicle comprising:

engaging a lane centering system configured to apply a centering torque so as to maintain travel of a vehicle centered in a lane centering zone of a lane; and transferring steering control from the lane centering system to a lane keeping system responsively to a detected failure of the lane centering system, the lane keeping system operative in accordance with a cost function employing predictive lateral offset and predictive heading angle, the lane keeping system configured to apply a torque so as to restore the travel of the vehicle in the lane centering zone, the torque exceeding the centering torque.

3. A non-transitory computer readable medium for an autonomous steering system comprising instructions, which when executed cause a processor to:

engage a lane centering system configured to apply a centering torque so as to maintain travel of a vehicle centered in a lane centering zone of a lane;

transfer steering control from the lane centering system to a lane keeping system responsively to a detected failure of the lane centering system, the lane keeping system operative in accordance with a cost function employing predictive lateral offset and predictive heading angle, the lane keeping system configured to apply a torque so as to restore the travel of the vehicle in the lane centering zone, the torque exceeding the centering torque.

* * * * *